United States Patent
Gallagher et al.

(10) Patent No.: US 9,909,505 B2
(45) Date of Patent: *Mar. 6, 2018

(54) EFFICIENT, LOW PRESSURE RATIO PROPULSOR FOR GAS TURBINE ENGINES

(71) Applicant: United Technologies Corporation, Hartford, CT (US)

(72) Inventors: Edward J. Gallagher, West Hartford, CT (US); Byron R. Monzon, Cromwell, CT (US); Shari L. Bugaj, Haddam, CT (US)

(73) Assignee: United Technologies Corporation, Farmington, CT (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/695,373

(22) Filed: Apr. 24, 2015

(65) Prior Publication Data

US 2016/0201607 A1    Jul. 14, 2016

Related U.S. Application Data

(63) Continuation-in-part of application No. 13/484,858, filed on May 31, 2012, now Pat. No. 9,121,368, and
(Continued)

(51) Int. Cl.
*F02C 7/36* (2006.01)
*F02K 1/06* (2006.01)
(Continued)

(52) U.S. Cl.
CPC .............. *F02C 7/36* (2013.01); *F01D 5/147* (2013.01); *F01D 5/282* (2013.01); *F01D 15/12* (2013.01);
(Continued)

(58) Field of Classification Search
CPC ... F02K 3/06; F02K 1/06; F01D 5/282; F01D 17/14; F01D 5/147; F01D 15/12;
(Continued)

(56) References Cited

U.S. PATENT DOCUMENTS 3,287,906 A    11/1966 McCormick
3,468,473 A     9/1969 Davies et al.
(Continued)

FOREIGN PATENT DOCUMENTS

EP    1712738    10/2006
GB    1516041     6/1978
(Continued)

OTHER PUBLICATIONS

Gray, D.E. et al. (1978). Energy efficient engine preliminary design and integration study. United Technologies Corporation; Pratt & Whitney Aircraft Group. Prepared for NASA. Nov. 1, 1978. pp. 1-366.
(Continued)

*Primary Examiner* — Carlos A Rivera
(74) *Attorney, Agent, or Firm* — Carlson, Gaskey & Olds, P.C.

(57) ABSTRACT

A gas turbine engine includes a core flow passage, a bypass flow passage, and a propulsor arranged at an inlet of the bypass flow passage and the core flow passage. The propulsor includes a row of propulsor blades. The row includes no more than 20 of the propulsor blades. The propulsor has a pressure ratio between about 1.2 and about 1.7 across the propulsor blades.

20 Claims, 3 Drawing Sheets

Related U.S. Application Data a continuation of application No. 13/176,365, filed on Jul. 5, 2011.

(51) Int. Cl.

| | | |
|---|---|---|
| *F02K 3/06* | (2006.01) | |
| *F01D 5/28* | (2006.01) | |
| *F01D 5/14* | (2006.01) | |
| *F01D 15/12* | (2006.01) | |
| *F04D 29/02* | (2006.01) | |
| *F04D 29/053* | (2006.01) | |
| *F04D 29/32* | (2006.01) | |
| *F04D 29/38* | (2006.01) | |
| *F04D 29/52* | (2006.01) | |
| *F04D 29/56* | (2006.01) | |

(52) U.S. Cl.
CPC ............... *F02K 1/06* (2013.01); *F02K 3/06* (2013.01); *F04D 29/023* (2013.01); *F04D 29/053* (2013.01); *F04D 29/325* (2013.01); *F04D 29/388* (2013.01); *F04D 29/526* (2013.01); *F04D 29/563* (2013.01); *F05D 2220/32* (2013.01); *F05D 2220/327* (2013.01); *F05D 2220/36* (2013.01); *F05D 2260/4031* (2013.01); *F05D 2300/603* (2013.01); *Y02T 50/672* (2013.01)

(58) Field of Classification Search
CPC ....... F05D 2260/4031; F05D 2220/327; F04D 29/023; F04D 29/053; F04D 29/325; F04D 29/388; F04D 29/526; F04D 29/563; F02C 7/36

See application file for complete search history.

(56) References Cited

U.S. PATENT DOCUMENTS

| | | | |
|---|---|---|---|
| 3,747,343 A | 7/1973 | Rosen | |
| 3,754,484 A | 8/1973 | Roberts | |
| 3,892,358 A | 7/1975 | Gisslen | |
| 4,130,872 A | 12/1978 | Harloff | |
| 4,486,146 A | 12/1984 | Campion | |
| 4,885,912 A | 12/1989 | Nakhamkin | |
| 5,141,400 A * | 8/1992 | Murphy | B29C 43/18 416/204 A |
| 5,169,288 A | 12/1992 | Gliebe et al. | |
| 5,433,674 A | 7/1995 | Sheridan et al. | |
| 5,447,411 A | 9/1995 | Curley et al. | |
| 5,524,847 A | 6/1996 | Brodell et al. | |
| 5,769,607 A | 6/1998 | Neely et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,004,095 A | 12/1999 | Waitz et al. | |
| 6,195,983 B1 | 3/2001 | Wadia et al. | |
| 6,223,616 B1 | 5/2001 | Sheridan | |
| 6,318,070 B1 | 11/2001 | Rey et al. | |
| 6,382,905 B1 * | 5/2002 | Czachor | F01D 11/122 415/128 |
| 6,709,239 B2 | 3/2004 | Chandraker | |
| 6,814,541 B2 | 11/2004 | Evans et al. | |
| 7,021,042 B2 | 4/2006 | Law | |
| 7,107,756 B2 | 9/2006 | Rolt | |
| 7,241,112 B2 * | 7/2007 | Dambrine | B29C 70/48 29/889.7 |
| 7,374,403 B2 | 5/2008 | Decker et al. | |
| 7,591,754 B2 | 9/2009 | Duong et al. | |
| 7,758,306 B2 | 7/2010 | Burton et al. | |
| 7,770,377 B2 | 8/2010 | Rolt | |
| 7,824,305 B2 | 11/2010 | Duong et al. | |
| 7,882,691 B2 | 2/2011 | Lemmers, Jr. et al. | |
| 7,926,260 B2 | 4/2011 | Sheridan et al. | |
| 7,950,237 B2 | 5/2011 | Grabowski et al. | |
| 8,205,432 B2 | 6/2012 | Sheridan | |
| 8,667,775 B1 | 3/2014 | Kisska et al. | |
| 9,121,412 B2 | 9/2015 | Gallagher et al. | |
| 2006/0228206 A1 | 10/2006 | Decker et al. | |
| 2007/0041842 A1 * | 2/2007 | Thompson | F01D 5/147 416/223 R |
| 2008/0095633 A1 | 4/2008 | Wilson | |
| 2008/0155961 A1 | 7/2008 | Johnson | |
| 2008/0206048 A1 * | 8/2008 | Coupe | B29C 70/24 415/200 |
| 2008/0226454 A1 | 9/2008 | Decker et al. | |
| 2009/0074565 A1 | 3/2009 | Suciu et al. | |
| 2009/0245997 A1 | 10/2009 | Hurwitz et al. | |
| 2010/0089019 A1 | 4/2010 | Knight et al. | |
| 2010/0148396 A1 | 6/2010 | Xie et al. | |
| 2010/0162683 A1 | 7/2010 | Grabowski et al. | |
| 2010/0218483 A1 | 9/2010 | Smith | |
| 2010/0260609 A1 | 10/2010 | Wood et al. | |
| 2010/0331139 A1 | 12/2010 | McCune | |
| 2011/0020130 A1 * | 1/2011 | Murakami | B29C 70/30 416/223 R |
| 2011/0142670 A1 * | 6/2011 | Pilpel | F03D 3/062 416/230 |
| 2013/0008146 A1 * | 1/2013 | Gallagher | F01D 17/14 60/226.3 |

FOREIGN PATENT DOCUMENTS

| | | |
|---|---|---|
| GB | 2041090 | 9/1980 |
| GB | 2426792 | 12/2006 |
| WO | 2007038674 | 4/2007 |
| WO | 2015034630 | 3/2015 |
| WO | 2015047511 | 4/2015 |

OTHER PUBLICATIONS

File History for U.S. Pat. No. 9,121,412.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971. p. 725, 729-732.
Willis, W.S. (1979). Quiet clean short-haul experimental engine final report. Prepared for NASA. Aug. 1979. pp. 1-293.
Sweetman, B. and Sutton, O. (1998). Pratt & Whitney's surprise leap: The announcement of the PW8000 geared turbofan caught the industry unawares. Interavia. Jun. 1998; 53, 621. pp. 25-26.
Brines, G. (1990). The turbofan of tomorrow. Mechanical Engineering; The Journal of the American Society of Mechanical Engineers. 112, 8. pp. 65-67.
Mattingly, J.D. (1996). Elements of gas turbine propulsion. McGraw-Hill. New York, NY. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, 923-925.
Gunston, B. (2000). Ed. Jane's aero-engines. Issue Seven. Janes Information Group Limited. Alexandria, VA. pp. 510-512.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF502: plugging the turbofan gap. Flight International, Jan. 30, 1982. p. 237-241.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Petition for Inter Partes Review of U.S. Pat. No. 9,121,412.

(56) References Cited

OTHER PUBLICATIONS

Declaration of Reza Abhari, Ph.D. In re U.S. Pat. No. 9,121,412. Executed Apr. 23, 2016. pp. 1-71.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment.case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines- Turbofan. Feb. 8, 2012.

Ivchenko-Progress AI-727M. Jane's Aero-engines, Aero-engines- Turbofan. Nov. 27, 2011.

Ivchenko-Progress D-727. Jane's Aero-engines, Aero-engines- Turbofan. Feb. 7, 2007.

Turbomeca Aubisque. Jane's Aero-engines, Aero-engines- Turbofan. Nov. 2, 2009.

Aviadvigatel D-110. Jane's Aero-engines, Aero-engines- Turbofan. Jun. 1, 2010.

Rolls-Royce M45H. Jane's Aero-engines, Aero-engines- Turbofan. Feb. 24, 2010.

Honeywell LF502. Jane's Aero-engines, Aero-engines- Turbofan. Feb. 9, 2012.

Honeywell LF507. Jane's Aero-engines, Aero-engines- Turbofan. Feb. 9, 2012.

Honeywell TFE731. Jane's Aero-engines, Aero-engines- Turbofan. Jul. 18, 2012.

NASA Conference Publication. Quiet, powered-lift propulsion. Cleveland, Ohio. Nov. 14-15, 1978. pp. 1-420.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8). Start p. 32.

(56) References Cited

OTHER PUBLICATIONS

Hendricks, E.S. and Tong, M.T. (2012). Performance and weight estimates for an advanced open rotor engine. NASA/TM-2012-217710. pp. 1-13.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.

Zalud, T. (1998). Gears put a new spin on turbofan performance. Machine Design, 70(20), p. 104.

Edkins, D.P. and Hirschkron, R.L. (1972). TF34 turbofan quiet engine study final report. NASA CR-120914. Dec. 31, 1972. pp. 1-96.

Marsh, G. (2012). Aero engines lose weight thanks to composites. Reinforced Plastics. 56(6). Nov. 1, 2012. pp. 32-35.

European Search Report for European Patent Application No. 16166928 dated Sep. 7, 2016.

European Search Report for European Patent Application No. 12174431 dated Sep. 8, 2016.

Zalud, T. (1998). "Gears Put a New Spin on Turbofan Performance" Nov. 5, 1998, 2010 Penton Media Inc.

Meier, N. (2005). Civil Turbojet/Turbofan Specifications. Retrieved from http://www.jet-engine.net/civtfspec.html.

Hendricks et al. "Performance and Weight Estimates for an Advanced Open Rotor Engine" NASA/TM-2012-217710, Sep. 2012, 20 pp.

Gunston, "Jane's Aero-Engines" Pratt & Whitney/USA, Mar. 2000, JAEng-Issue 7, 5 pp.

Kandebo, "Geared-Turbofan Engine Design Targets Cost, Complexity" Aviation Week & Space Technology; New York; Feb. 23, 1998, 4 pp.

\* cited by examiner

EFFICIENT, LOW PRESSURE RATIO PROPULSOR FOR GAS TURBINE ENGINES

CROSS REFERENCE TO RELATED APPLICATIONS

The present disclosure is a continuation-in-part of U.S. application Ser. No. 13/484,858, filed May 31, 2012, which is a continuation of U.S. application Ser. No. 13/176,365, filed Jul. 5, 2011.

STATEMENT REGARDING FEDERALLY SPONSORED RESEARCH OR DEVELOPMENT

This invention was made with government support under contract number NAS3-01138 awarded by NASA. The government has certain rights in the invention.

BACKGROUND

This disclosure relates to gas turbine engines and, more particularly, to an engine having a geared turbo fan architecture that is designed to efficiently operate with a high bypass ratio and a low pressure ratio.

The overall propulsive efficiency and fuel burn of a gas turbine engine depends on many different factors, such as the design of the engine and the resulting performance debits on the fan that propels the engine. As an example, the fan rotates at a high rate of speed such that air passes over the blades at transonic or supersonic speeds. The fast-moving air creates flow discontinuities or shocks that result in irreversible propulsive losses. Additionally, physical interaction between the fan and the air causes downstream turbulence and further losses. Although some basic principles behind such losses are understood, identifying and changing appropriate design factors to reduce such losses for a given engine architecture has proven to be a complex and elusive task.

SUMMARY

A gas turbine engine according to an example of the present disclosure includes a core flow passage, a bypass flow passage, and a propulsor arranged at an inlet of the bypass flow passage and the core flow passage. The propulsor includes a row of propulsor blades. The row includes no more than 20 of the propulsor blades. The propulsor has a pressure ratio of between about 1.2 or 1.3 and about 1.7 across the propulsor blades.

In a further embodiment of any of the foregoing embodiments, the pressure ratio is between about 1.3 and about 1.4.

In a further embodiment of any of the foregoing embodiments, each of the propulsor blades extends radially between a root and a tip and in a chord direction between a leading edge and a trailing edge at the tip to define a chord dimension (CD). The row of propulsor blades defines a circumferential pitch (CP) with regard to the tips. The row of propulsor blades has a solidity value (R) defined as CD/CP that is between about 0.9 or 1.0 and about 1.3.

In a further embodiment of any of the foregoing embodiments, the propulsor is coupled to be driven by a turbine through a spool, and a gear assembly is coupled between the propulsor and the spool such that rotation of the turbine drives the propulsor at a different speed than the spool.

In a further embodiment of any of the foregoing embodiments, the propulsor blades include a carbon-fiber reinforced polymer matrix material.

In a further embodiment of any of the foregoing embodiments, the polymer of the carbon-fiber reinforced polymer matrix material is a thermoplastic polymer.

In a further embodiment of any of the foregoing embodiments, the propulsor blades each further comprise a sheath on a leading edge thereof.

In a further embodiment of any of the foregoing embodiments, each of the propulsor blades includes a first distinct region of carbon-fiber reinforced polymer matrix material and a second distinct region of a non-carbon-fiber reinforced polymer matrix material.

In a further embodiment of any of the foregoing embodiments, the propulsor blades each include a distinct core that supports a skin of carbon-fiber reinforced polymer matrix material.

In a further embodiment of any of the foregoing embodiments, the skin of carbon-fiber reinforced polymer matrix material has a three-dimensional fiber structure.

In a further embodiment of any of the foregoing embodiments, the core is formed of a metallic material.

In a further embodiment of any of the foregoing embodiments, the core is formed of a fiber-reinforced material that is different in composition from the carbon-fiber reinforced polymer matrix material.

A further embodiment of any of the foregoing embodiments includes a case surrounding the propulsor, the case including a carbon-fiber reinforced polymer matrix material.

A further embodiment of any of the foregoing embodiments includes a case surrounding the propulsor. The case and the propulsor blades include a carbon-fiber reinforced polymer matrix material. The propulsor blades each include an airfoil body that has a distinct core that supports a skin of the carbon-fiber reinforced polymer matrix material, and a sheath secured on a leading edge of the airfoil body.

In a further embodiment of any of the foregoing embodiments, wherein the carbon-fiber reinforced polymer matrix material of the propulsor blades is different from the carbon-fiber reinforced polymer matrix material of the case with respect to composition.

In a further embodiment of any of the foregoing embodiments, the row includes no more than 17 of the propulsor blades.

In a further embodiment of any of the foregoing embodiments, the propulsor blades each include a distinct core that supports a skin of the carbon-fiber reinforced polymer matrix material.

In a further embodiment of any of the foregoing embodiments, the fiber reinforced polymer matrix material of the case includes carbon fibers.

A gas turbine engine according to an example of the present disclosure includes a core flow passage, a bypass flow passage, and a propulsor arranged at an inlet of the bypass flow passage and the core flow passage. The propulsor includes a row of propulsor blades. The row includes no more than 20 of the propulsor blades and the propulsor blades include a carbon-fiber reinforced polymer matrix material. Each of the propulsor blades extends radially between a root and a tip and in a chord direction between a leading edge and a trailing edge at the tip to define a chord dimension (CD). The row of propulsor blades defines a circumferential pitch (CP) with regard to the tips. The row of propulsor blades has a solidity value (R) defined as CD/CP that is less than about 1.2 or less than about 1.1.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
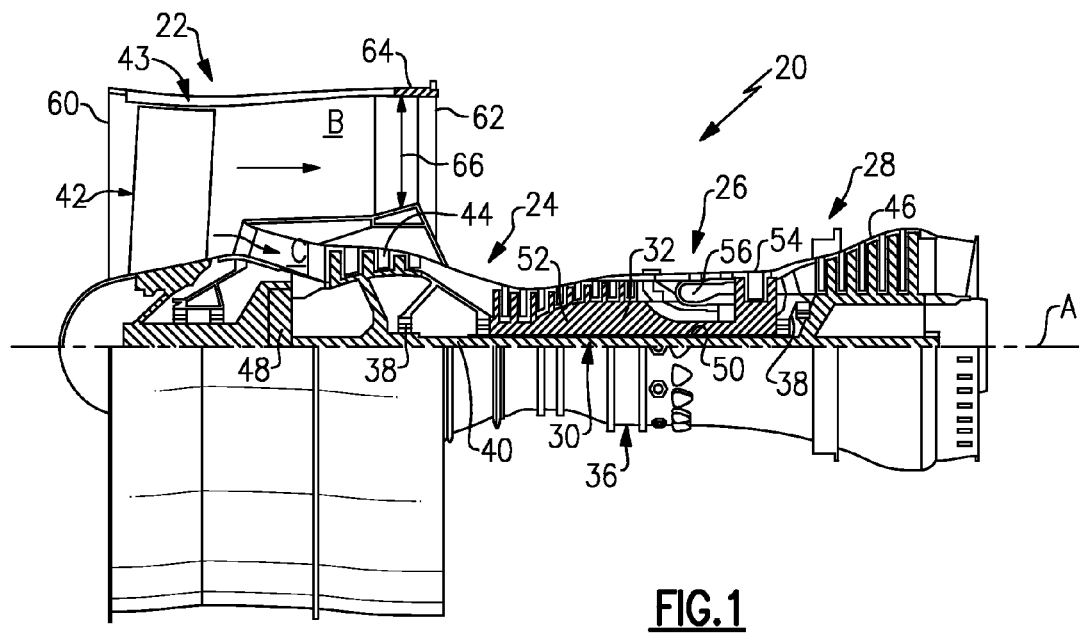
FIG. 1 is a schematic cross-section of an embodiment of a gas turbine engine.

FIG. 1 schematically illustrates a gas turbine engine 20. The gas turbine engine 20 may be a two-spool turbofan that generally incorporates a fan section 22, a compressor section 24, a combustor section 26 and a turbine section 28. Alternative engine architectures may include a single-spool design, a three-spool design, or an open rotor design, among other systems or features.

The fan section 22 drives air along a bypass flow passage B while the compressor section 24 drives air along a core flow passage C for compression and communication into the combustor section 26. Although depicted as a turbofan gas turbine engine, it is to be understood that the concepts described herein are not limited to use with turbofans and the teachings may be applied to other types of gas turbine engines.

The engine 20 includes a low speed spool 30 and high speed spool 32 mounted for rotation about an engine central longitudinal axis A relative to an engine static structure 36 via several bearing systems 38. The low speed spool 30 generally includes an inner shaft 40 that is coupled with a propulsor 42, a low pressure compressor 44 and a low pressure turbine 46. The propulsor 42 is in the fan section 22 and a case 43 surrounds the propulsor 42. The low pressure turbine 46 drives the propulsor 42 through the inner shaft 40 and a gear assembly 48, which allows the low speed spool 30 to drive the propulsor 42 at a different (e.g. lower) angular speed.

The high speed spool 32 includes an outer shaft 50 that is coupled with a high pressure compressor 52 and a high pressure turbine 54. A combustor 56 is arranged between the high pressure compressor 52 and the high pressure turbine 54. The inner shaft 40 and the outer shaft 50 are concentric and rotate about the engine central longitudinal axis A, which is collinear with their longitudinal axes.

A core airflow in core flow passage C is compressed by the low pressure compressor 44 then the high pressure compressor 52, mixed with the fuel in the combustor 56, and then expanded over the high pressure turbine 54 and low pressure turbine 46. The turbines 54, 46 rotationally drive the respective low speed spool 30 and high speed spool 32 in response to the expansion.

As shown, the propulsor 42 is arranged at an inlet 60 of the bypass flow passage B and core flow passage C. Air flow through the bypass flow passage B exits the engine 20 through an outlet 62 or nozzle. For a given design of the propulsor 42, the inlet 60 and the outlet 62 of the engine 20 define a design (fan) pressure ratio with regard to an inlet pressure at the inlet 60 and an outlet pressure at the outlet 62 of the bypass flow passage B. As an example, the design pressure ratio may be determined based upon the stagnation inlet pressure and the stagnation outlet pressure at a design rotational speed of the engine 20. In that regard, the engine 20 may optionally include a variable area nozzle 64 within the bypass flow passage B. The variable area nozzle 64 is operative to change a cross-sectional area 66 of the outlet 62 to thereby control the pressure ratio via changing pressure within the bypass flow passage B. The design pressure ratio may be defined with the variable area nozzle 64 fully open or fully closed.

Figure 2:
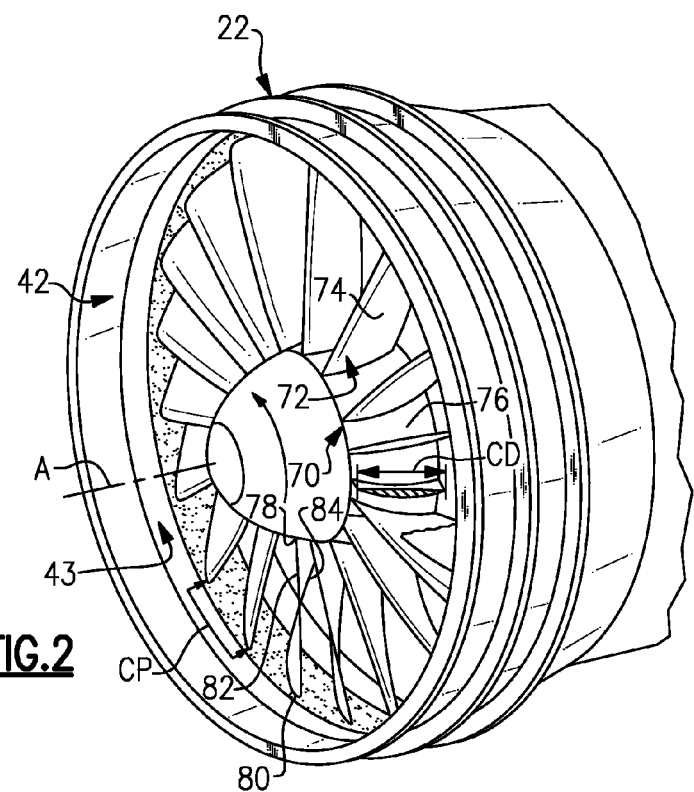
FIG. 2 is a perspective view of a fan section of the engine of FIG. 1.

Referring to FIG. 2, the propulsor 42, which in this example is a fan, includes a rotor 70 having a row 72 of propulsor blades 74 that extend a circumferentially around a hub 76. Each of the propulsor blades 74 extends radially outwardly from the hub 76 between a root 78 and a tip 80 and in a chord direction (axially and circumferentially) between a leading edge 82 and a trailing edge 84. A chord dimension (CD) is a length between the leading edge 82 and the trailing edge 84 at the tip of each propulsor blade 74. The row 72 of propulsor blades 74 also defines a circumferential pitch (CP) that is equivalent to the arc distance between the tips 80 of neighboring propulsor blades 74.

As will be described, the example propulsor 42 includes a number (N) of the propulsor blades 74 and a geometry that, in combination with the architecture of the engine 20, provides enhanced overall propulsive efficiency by reducing performance debits of the propulsor 42.

In the illustrated example, the number N of propulsor blades in the row 72 is no more than 20. In one example, the propulsor 42 includes 18 of the propulsor blades 74 uniformly circumferentially arranged about the hub 76. In other embodiments, the number N may be any number of blades from 12-20.

The propulsor blades 74 define a solidity value with regard to the chord dimension CD and the circumferential pitch CP. The solidity value is defined as a ratio (R) of CD/CP (i.e., CD divided by CP). In embodiments, the solidity value of the propulsor 42 is between 0.9 or 1.0 and 1.3. In further embodiments, the solidity value is from 1.1 to 1.2. In additional embodiments, the solidity value is less than 1.1, and in a further example is also greater than 0.85.

Additionally, in combination with the given example solidity values, the fan 22 of the engine 20 may be designed with a particular design pressure ratio. In embodiments, the design pressure ratio may be between 1.2 or 1.3 and 1.55. In a further embodiment, the design pressure ratio may be between 1.3 and 1.4. In further examples, the design pressure ratio is between 1.3 and 1.7.

The engine 20 may also be designed with a particular bypass ratio with regard to the amount of air that passes through the bypass flow passage B and the amount of air that passes through the core flow passage C. As an example, the design bypass ratio of the engine 20 may nominally be 12, or alternatively in a range of approximately 8.5 to 13.5 or 18.

The propulsor 42 also defines a ratio of N/R. In embodiments, the ratio N/R is from 9 to 20. In further embodiments, the ratio N/R is from 14 to 16. The table below shows additional examples of solidity and the ratio N/R for different numbers of propulsor blades 74.

TABLE

Number of Blades, Solidity and Ratio N/R

| Number of Blades (N) | Solidity | Ratio N/R |
|---|---|---|
| 20 | 1.3 | 15.4 |
| 18 | 1.3 | 13.8 |
| 16 | 1.3 | 12.3 |
| 14 | 1.3 | 10.8 |
| 12 | 1.3 | 9.2 |
| 20 | 1.2 | 16.7 |
| 18 | 1.2 | 15.0 |
| 16 | 1.2 | 13.3 |
| 14 | 1.2 | 11.7 |
| 12 | 1.2 | 10.0 |
| 20 | 1.1 | 18.2 |
| 18 | 1.1 | 16.4 |
| 16 | 1.1 | 14.5 |
| 14 | 1.1 | 12.7 |
| 12 | 1.1 | 10.9 |
| 20 | 1.0 | 20.0 |
| 18 | 1.0 | 18.0 |
| 16 | 1.0 | 16.0 |
| 14 | 1.0 | 14.0 |
| 12 | 1.0 | 12.0 |

The disclosed ratios of N/R enhance the overall propulsive efficiency and fuel burn of the disclosed engine 20. For instance, the disclosed ratios of N/R are designed for the geared turbo fan architecture of the engine 20 that utilizes the gear assembly 48. That is, the gear assembly 48 allows the propulsor 42 to rotate at a different, lower speed than the low speed spool 30. In combination with the variable area nozzle 64, the propulsor 42 can be designed with a large diameter and rotate at a relatively slow speed with regard to the low speed spool 30. A relatively low speed, relatively large diameter, and the geometry that permits the disclosed ratios of N/R contribute to the reduction of performance debits, such as by lowering the speed of the air or fluid that passes over the propulsor blades 74.

Figure 3:
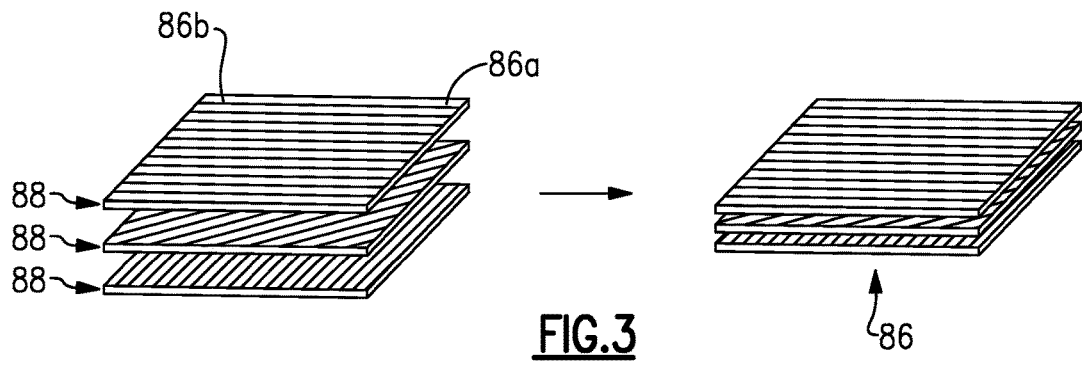
FIG. 3 illustrates an embodiment of a carbon-fiber reinforced polymer matrix material.

The propulsor blades 74 can include a carbon-fiber reinforced polymer matrix material, an example portion of which is depicted in FIG. 3 at 86. In this example, the material 86 includes carbon fibers 86a that are disposed in a polymer matrix 86b. The propulsor blades 74 can be formed exclusively of the material 86 or partially of the material 86 in combinations with alloys or other fiber-reinforced materials.

Figure 4:
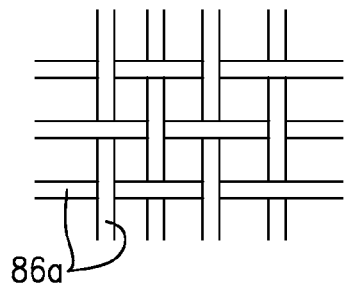
FIG. 4 illustrates an embodiment of a two-dimensional woven fiber structure.
Figure 5:
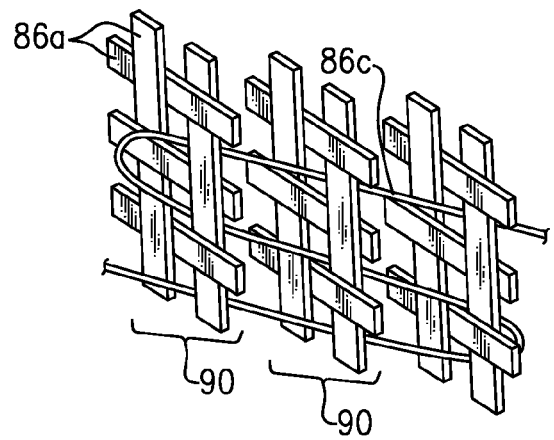
FIG. 5 illustrates an embodiment of a three-dimensional fiber structure.

The material 86 can include a plurality of carbon fiber layers 88 that are stacked and consolidated to form the material 86. For example, the fiber layers 88 can each have uni-directionally oriented fibers and the layers 88 can be cross-plied. In further examples, one or more of the layers 88 has a different fiber structure, such as but not limited to, random fiber orientation, woven, or three-dimensional. An example two-dimensional woven fiber structure is depicted in FIG. 4. An example three-dimensional fiber structure is depicted in FIG. 5. In this example, the fibers 86a are woven into sheets 90, and transverse fibers 86c bundle the sheets 90 to one another. As can be appreciated, other two- or three-dimensional fiber structures could alternatively or additionally be used.

The polymer matrix 86b can include thermoplastic polymer, thermoset polymer, or combinations thereof. Thermoset polymers can include, but are not limited to, epoxy and phenolic. Thermplastic polymers can include, but are not limited to, polyethers and polyimides.

The carbon fibers 86a provide the material 86 with strength and stiffness. For example, the properties of the carbon fibers 86a can be selected in accordance with desired properties of the material 86, and thus desired properties of the propulsor blades 74. In one example, the carbon fibers 86a are polyacrylonitrile or polyacrylonitrile-based. The fibers are initially with polyacrylonitrile fibers and are then graphitized. Alternatively, the fibers are initially thermoplastic fibers that are then graphitized. thermoplastics can include, but are not limited to, polyethylene, polyarylether, and poly ether ether ketones. In further examples, the carbon fibers 86a have an average diameter of 1-100 micrometers. Alternatively, the carbon fibers 86a are nano-sized and have a diameter of less than 1 micrometer. In other examples, the carbon fibers 86a are carbon-containing such that the fibers include carbon as a primary constituent or element. In one example, the carbon fibers 86a are carbide.

Figure 6:
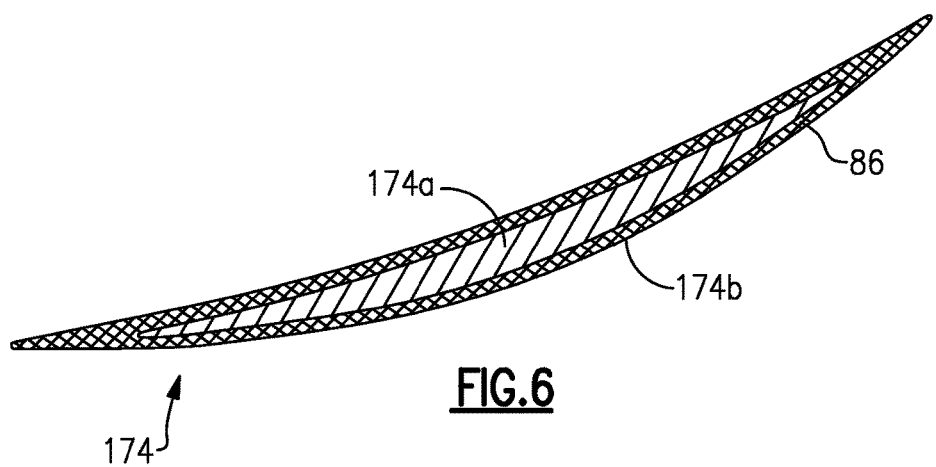
FIG. 6 is a cross-section of an embodiment of a propulsor blade that has a distinct core and a skin of carbon-fiber reinforced polymer matrix material.

FIG. 6 illustrates a cross-sectional view of another example propulsor blade 174, which may include any of the aforementioned features. In this disclosure, like reference numerals designate like elements where appropriate and reference numerals with the addition of one-hundred or multiples thereof designate modified elements that are understood to incorporate the same features and benefits of the corresponding elements. In this example, the propulsor blade 174 includes a distinct core 174a that supports a skin 174b of the carbon-fiber reinforced polymer matrix material 86. In this example, the core 174a is a solid piece, but it alternatively can be hollow to reduce weight.

The core 174a can be formed of a metallic material, a fiber reinforced polymer matrix material, or combinations thereof. An example metallic material includes a titanium-based alloy. The fiber reinforced polymer matrix material can include carbon fiber, as in any of the examples of the material 86. Alternatively, the fibers in the core 174a are non-carbon fibers. Example non-carbon fibers can include, but are not limited to, glass fibers, metallic fibers, ceramic fibers, polymeric fibers, and combinations thereof.

In further examples, the core 174 is formed of a fiber-reinforced material that is different in composition from the material 86 of the skin 174b. The difference in composition can be in the kinds of polymers of the matrices, the kinds of fibers, the amounts of the polymer matrices, the amounts of the fibers, or any combination of such differences.

In further examples, the skin 174b is the multi-layered structure of the material 86. For example, layers 88 are laid-up on or around the core 174a and then consolidated. Alternatively, the skin 174b is a continuous sleeve. The core 174a is inserted into the sleeve and then the skin 174b is consolidated. In one further example, the material 86 of the sleeve has a three-dimensional fiber structure.

Figure 7:
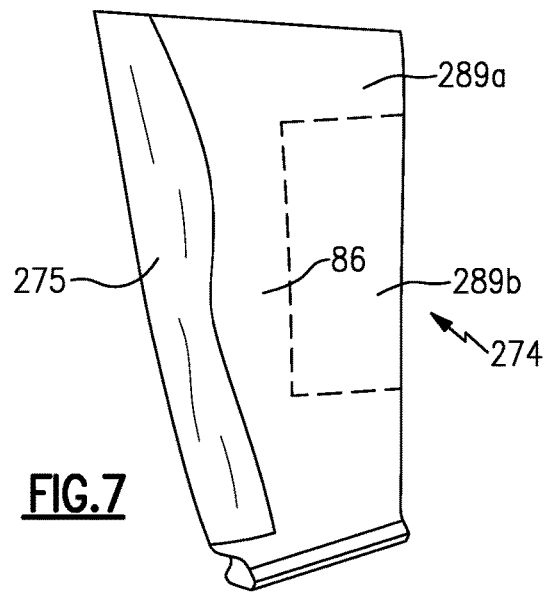
FIG. 7 illustrates an embodiment of a propulsor blade that has a sheath.

FIG. 7 illustrates another example propulsor blade 274 that is formed of the material 86. In this example, the propulsor blade 274 also includes a sheath 275 on a leading edge of the blade. For example, the sheath 275 protects the propulsor blade 274 from foreign object impact. In one example, the sheath 275 is formed of a metallic material. The metallic material can include, but is not limited to, a titanium-based alloy, a cobalt-based alloy, or combinations thereof. In further examples, the sheath 275 is multi-layered and includes at least one layer of a metallic material. One or more additional layers can include a layer of a metallic material of a different composition, a layer of a polymer-based material, or combinations thereof.

The sheath 275 is secured to the leading edge of the propulsor blade 274. In this regard, the sheath 275 can be bonded using an adhesive, mechanically attached to the blade, or secured by a combination of adhesive bonding and mechanical attachment.

In a further example, the propulsor blade 274 includes a first distinct region 289a (outside of dashed line region) of carbon-fiber reinforced polymer matrix material 86 and a second distinct region 289b (inside dashed line region) of a non-carbon-fiber reinforced polymer matrix material. The non-carbon fibers can include, but are not limited to, glass fibers, aramid fibers, boron fibers, carbide fibers, or combinations thereof. The second distinct region 289b of non-carbon-fiber reinforced polymer matrix material provides the ability to locally tailor the performance of the propulsor blade 274 with regard to properties. For example, the vibrational properties are locally tailored through selection of the properties of the second distinct region 289b to control vibration or control response to an impact event.

Figure 8:
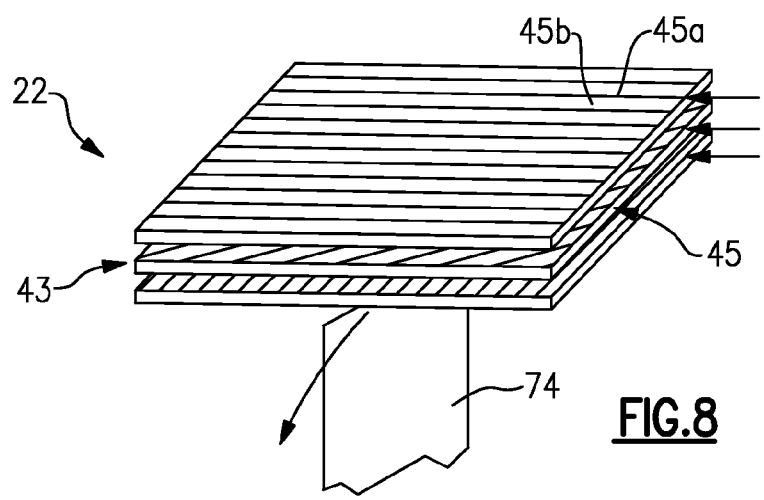
FIG. 8 illustrates a portion of an embodiment of a case and propulsor blade.

FIG. 8 illustrates selected portions of the fan section 22 of the engine 20, including the case 43 and a portion of one of the propulsor blades 74. The case 43 serves as a containment structure in the case of a blade release event. For example, the case 43 includes a fiber reinforced polymer matrix material 45. The material 45 includes fibers 45a that are disposed in a polymer matrix 45b. The fibers 45a can be carbon fibers or non-carbon fibers. Non-carbon fibers can include, but are not limited to, glass fibers, aramid fibers, or combinations thereof. In one example, the material 45 includes a plurality of fiber layers 45c that are stacked and consolidated to form the material 45. For example, all of the layers 45c have the same kind of fibers. In other examples, alternating layers 45c, or an alternating pattern of layers 45c, have different kinds of fibers, one of which is carbon fibers.

In further examples, the carbon-fiber reinforced polymer matrix material 86 of the propulsor blades 74 is different from the carbon-fiber reinforced polymer matrix material 45 of the case 43 with respect to composition. The difference in composition can be in the kinds of polymers of the matrices, the kinds of fibers, the amounts of the polymer matrices, the amounts of the fibers, or any combination of such differences. Further, the differences can be tailored for thermal conformance between the propulsor blades 74 and the case 43.

Figure 9:
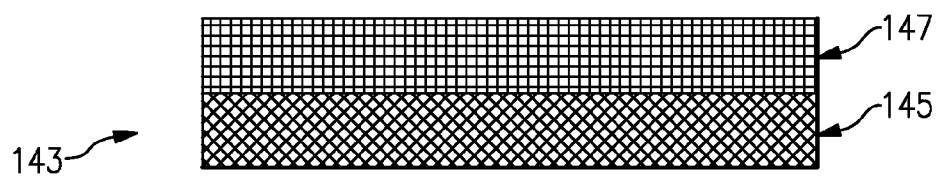
FIG. 9 illustrates another embodiment of a case.

FIG. 9 illustrates another example case 143 that includes a layer of the material 45 adjacent a layer 147. The layer 147 can be a layer of carbon-fiber reinforced polymer matrix material, non-carbon-fiber reinforced polymer matrix material, or metallic material, such as in a honeycomb or acoustic structure.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
a turbine;
a gear assembly;
a core flow passage;
a bypass flow passage, said bypass flow passage having an inlet having a stagnation inlet pressure, and an outlet having a stagnation outlet pressure;
a design pressure ratio with regard to said stagnation inlet pressure and said stagnation outlet pressure, said design pressure ratio being from 1.3 to 1.55; and
a propulsor coupled with said turbine through said gear assembly, said propulsor arranged within said bypass flow passage, said propulsor including a row of propulsor blades, said row includes no more than 20 of said propulsor blades, wherein each of said propulsor blades extends radially between a root and a tip and in a chord direction between a leading edge and a trailing edge at said tip to define a chord dimension (CD), said row of propulsor blades defining a circumferential pitch (CP) with regard to said tips, and said row of propulsor blades has a solidity value (R) at said tips defined as CD/CP that is from 1.0 to 1.3.

2. The gas turbine engine as recited in claim 1, wherein said pressure ratio is between about 1.3 and about 1.4.

3. The gas turbine engine as recited in claim 1, wherein said propulsor blades include a carbon-fiber reinforced polymer matrix material.

4. The gas turbine engine as recited in claim 3, wherein said polymer of said carbon-fiber reinforced polymer matrix material is a thermoplastic polymer.

5. The gas turbine engine as recited in claim 4, wherein said thermoplastic polymer includes polyether or polyimide.

6. The gas turbine engine as recited in claim 3, wherein said propulsor blades each further comprise a sheath on a leading edge thereof.

7. The gas turbine engine as recited in claim 1, wherein each of said propulsor blades includes a first distinct region of carbon-fiber reinforced polymer matrix material and a second distinct region of a non-carbon-fiber reinforced polymer matrix material.

8. The gas turbine engine as recited in claim 1, wherein said propulsor blades each include a distinct core that supports a skin of carbon-fiber reinforced polymer matrix material.

9. The gas turbine engine as recited in claim 8, wherein said skin of carbon-fiber reinforced polymer matrix material has a three-dimensional fiber structure.

10. The gas turbine engine as recited in claim 9, wherein said three-dimensional fiber structure includes woven fiber sheets and transverse fibers that bundle said woven fiber sheets together.

11. The gas turbine engine as recited in claim 9, wherein said core is formed of a metallic material.

12. The gas turbine engine as recited in claim 9, wherein said core is formed of a fiber-reinforced material that is different in composition from said carbon-fiber reinforced polymer matrix material.

13. The gas turbine engine as recited in claim 1, wherein said solidity value (R) at said tips is from 1.0 to 1.2.

14. The gas turbine engine as recited in claim 13, wherein said solidity value (R) at said tips is from 1.0 to 1.1 and said row includes no more than 18 of said propulsor blades.

15. The gas turbine engine as recited in claim 14, further comprising a ratio of propulsor blades (N) to the solidity value (R) at said tips within a range from 14 to 16.

16. The gas turbine engine as recited in claim 15, further comprising a bypass ratio within a range from 8.5 to 13.5.

17. The gas turbine engine as recited in claim 16, further comprising a case surrounding said propulsor, said case including a carbon-fiber reinforced polymer matrix material.

18. The gas turbine engine as recited in claim 16, further comprising a case surrounding said propulsor, said case and said propulsor blades including a carbon-fiber reinforced polymer matrix material.

19. The gas turbine engine as recited in claim 18, wherein said carbon-fiber reinforced polymer matrix material of said propulsor blades is different from said carbon-fiber reinforced polymer matrix material of said case with respect to composition.

20. The gas turbine engine as recited in claim 19, wherein said propulsor blades further include a three-dimensional fiber structure.

\* \* \* \* \*